(12) United States Patent
Flintham

(10) Patent No.: US 7,100,736 B2
(45) Date of Patent: Sep. 5, 2006

(54) SERVICEABLE MUFFLER

(75) Inventor: Stuart A. Flintham, Birstall (GB)

(73) Assignee: Fleetguard, Inc., Nashville, TN (US)

( * ) Notice: Subject to any disclaimer, the term of this patent is extended or adjusted under 35 U.S.C. 154(b) by 293 days.

(21) Appl. No.: 10/685,273

(22) Filed: Oct. 14, 2003

(65) Prior Publication Data
US 2005/0077104 A1 Apr. 14, 2005

(51) Int. Cl.
F01N 1/16 (2006.01)
F02K 1/08 (2006.01)
B64F 1/26 (2006.01)
F01N 7/18 (2006.01)

(52) U.S. Cl. ............... 181/243; 181/241; 181/217; 181/219

(58) Field of Classification Search ........... 181/243, 181/241, 252, 256, 258, 227, 228, 217, 219; 29/890.08
See application file for complete search history.

(56) References Cited

U.S. PATENT DOCUMENTS

| 2,273,210 A | | 2/1942 | Lowther et al. |
| 2,732,092 A | | 1/1956 | Lawrence |
| 3,078,650 A | | 2/1963 | Anderson et al. |
| 3,423,909 A | | 1/1969 | Bennett et al. |
| 3,616,618 A | | 11/1971 | Gronholz et al. |
| 3,834,134 A | | 9/1974 | McAllister |
| 3,921,754 A | * | 11/1975 | Hess ............... 181/212 |
| 4,020,783 A | | 5/1977 | Anderson et al. |
| 4,055,133 A | * | 10/1977 | Wessely ............. 413/6 |
| 4,278,455 A | | 7/1981 | Nardi |
| 4,312,651 A | | 1/1982 | Easki et al. |
| 4,378,983 A | * | 4/1983 | Martin ............. 55/357 |
| 4,488,889 A | | 12/1984 | McCarroll |
| 4,693,337 A | * | 9/1987 | Timmermeister ..... 181/231 |
| 5,863,313 A | * | 1/1999 | Coulonvaux ......... 55/498 |
| 6,446,322 B1 | * | 9/2002 | Church ............. 29/513 |
| 6,575,267 B1 | * | 6/2003 | Stiles et al. ........ 181/282 |

FOREIGN PATENT DOCUMENTS

| DE | 1 300 130 | 9/1969 |
| EP | 0 595 458 | 5/1994 |
| EP | 1 298 289 | 4/2003 |
| FR | 2197645 | 3/1974 |
| GB | 882647 | 11/1961 |
| GB | 989345 | 4/1965 |
| GB | 989478 | 4/1965 |
| GB | 2 010 389 | 6/1979 |
| GB | 1598099 | 9/1981 |

* cited by examiner

Primary Examiner—Edgardo San Martin
Assistant Examiner—Jeremy Luks
(74) Attorney, Agent, or Firm—Andrus, Sceales, Starke & Sawall, LLP

(57) ABSTRACT

A serviceable muffler (20) has an end plate (34) releasably clamped (36) to an open end (30) of a muffler body (26) and permitting access to an internal catalytic or filter element (28) for removal and replacement. An apertured flange (44) has an outer border with flared rounded portion (46) complemental to flared rounded portions (40 and 42) of each of the end plate (34) and the open end (30) of the body (26), and having an inner border defined by an aperture (48) through which the element (28) is removed and replaced. Servicing and manufacturing methods are provided.

5 Claims, 4 Drawing Sheets

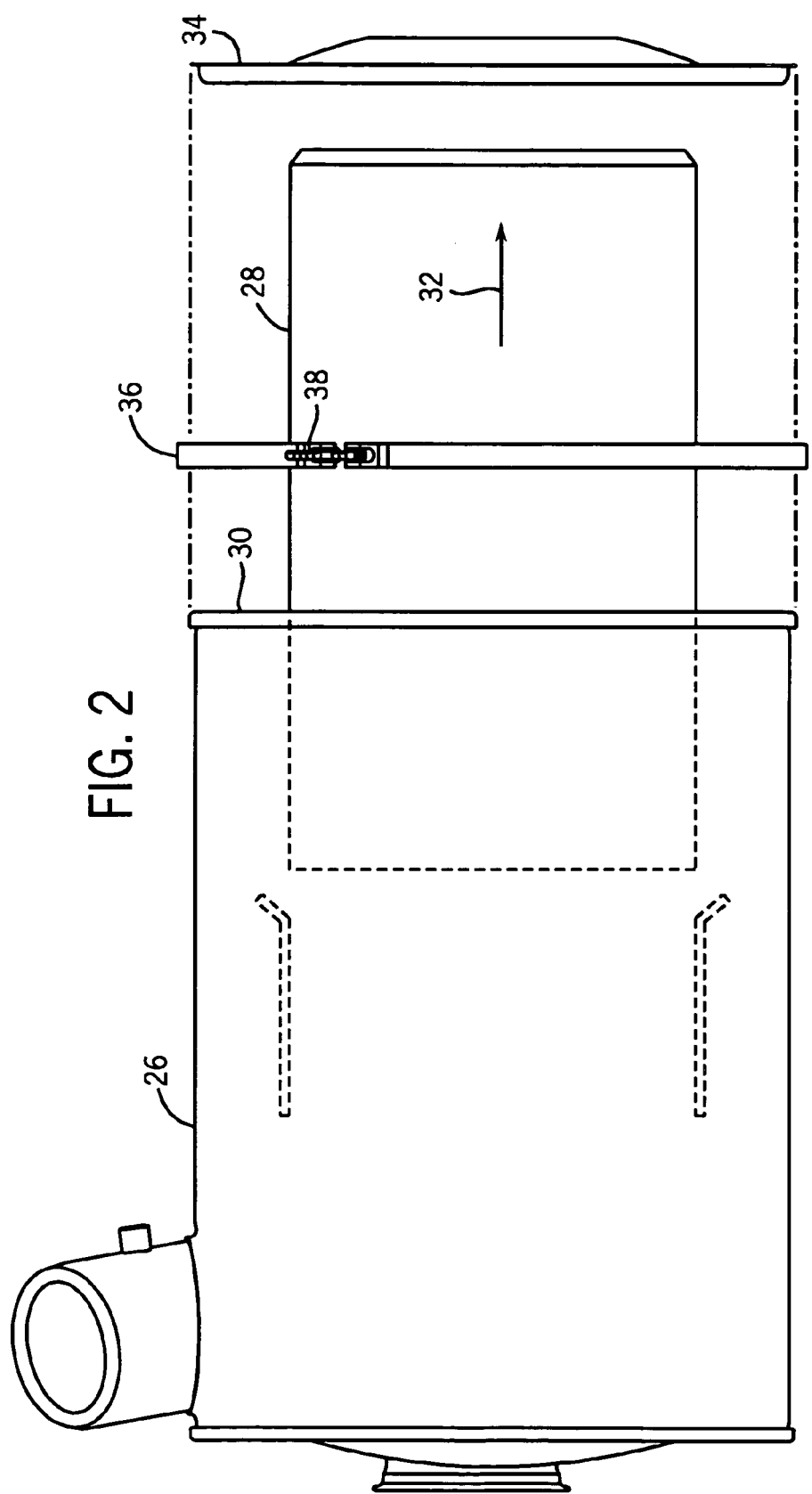

SERVICEABLE MUFFLER

BACKGROUND AND SUMMARY OF THE INVENTION

The invention relates to mufflers, and more particularly to serviceable mufflers containing an element requiring servicing.

Emission regulations for internal combustion engines are requiring ever decreasing levels of emissions. It has accordingly become necessary to fit catalysts and filters inside of mufflers to treat engine exhaust. Particle filters for diesel engines require routine cleaning to remove ash built-up from the filters. Catalytic elements also require maintenance and/or replacement.

The present invention provides a serviceable muffler permitting easy removal of an end plate from an open end of a muffler body for gaining access to an internal filter element and/or catalytic element. The invention eliminates the need for welding, and the need for a sealing gasket. The invention further provides particularly cost effective manufacturability. The invention uses high speed lock forming techniques providing precise mounting and sealing structure.

BRIEF DESCRIPTION OF THE DRAWINGS

FIG. 2 is like FIG. 1 but shows removal of the muffler end plate for gaining access to an internal element requiring servicing.

DETAILED DESCRIPTION

Figure 1:
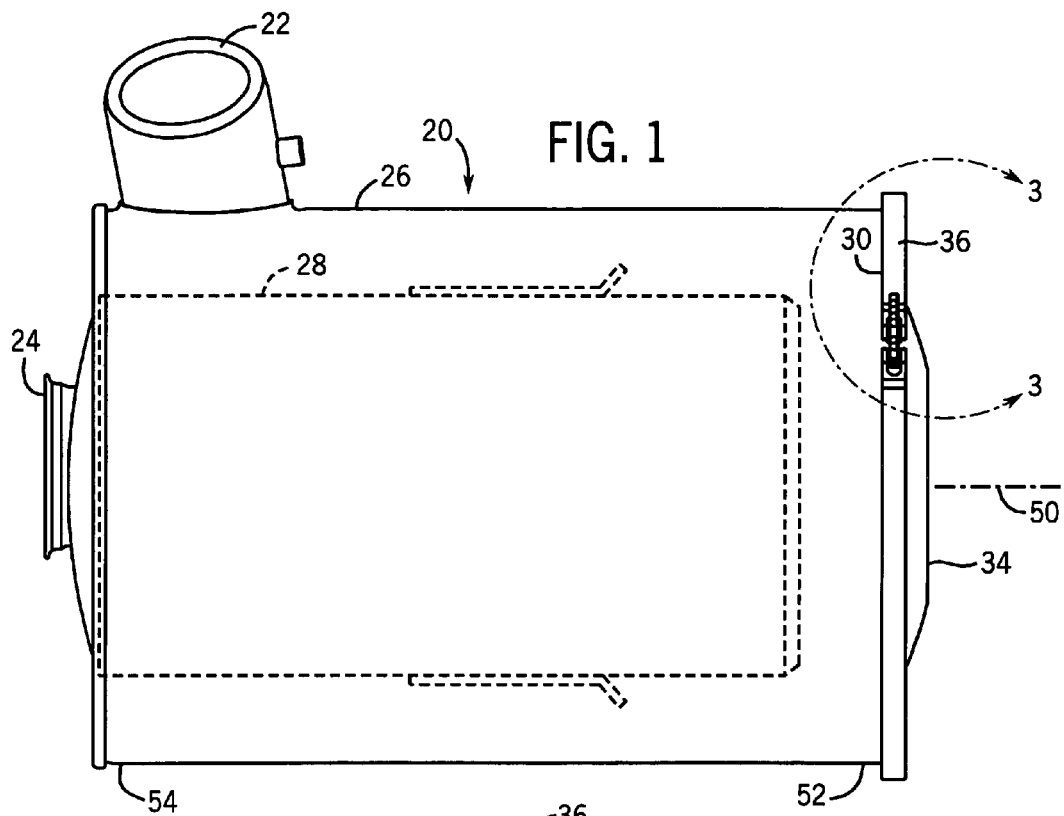
FIG. 1 is a side elevation view of a muffler in accordance with the invention.

FIG. 1 shows a serviceable muffler 20 with inlet 22, outlet 24, and having a muffler body 26 containing an internal element 28 requiring servicing, for example a particulate filter element and/or a catalytic element. The body has an open end 30, FIGS. 1, 2, allowing access to element 28 for removal and replacement of element 28 through open end 30, e.g. rightward removal as shown at arrow 32 in FIG. 2. An end plate 34 closes body 26 at open end 30. Preferably, both of open end 30 and end plate 34 have a flared rounded portion, to be described. A clamp 36 releasably clamps end plate 34 to open end 30 to close body 26, and is releasable to permit removal of end plate 34, FIG. 2, from open end 30 of body 26 for gaining access to element 28. Clamp 36 is preferably tightened by a threaded bolt 38 along its circumference, and released by untightening such bolt, as is known. Body 26 is closed by end plate 34 without welding. Body 26 is closed by end plate 34 and sealed thereto at open end 30 without the need for a gasket.

Figure 3:
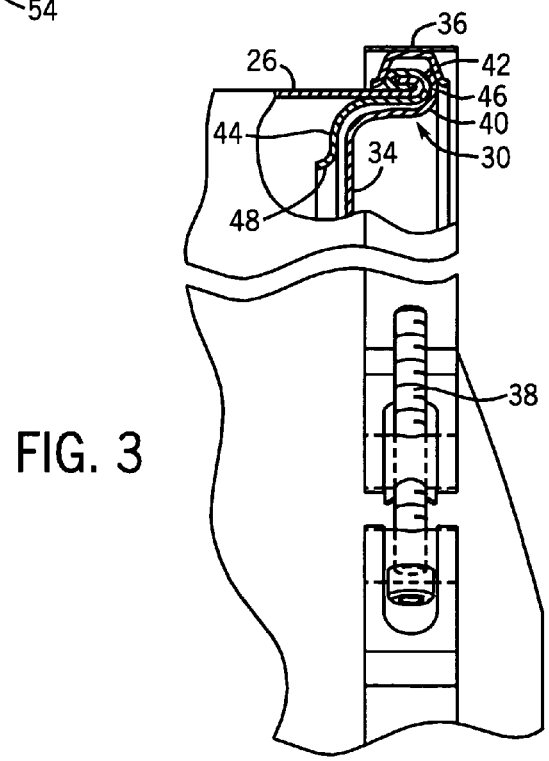
FIG. 3 is an enlarged view of a portion of FIG. 1 at 3—3, partially cut away.
Figure 10:
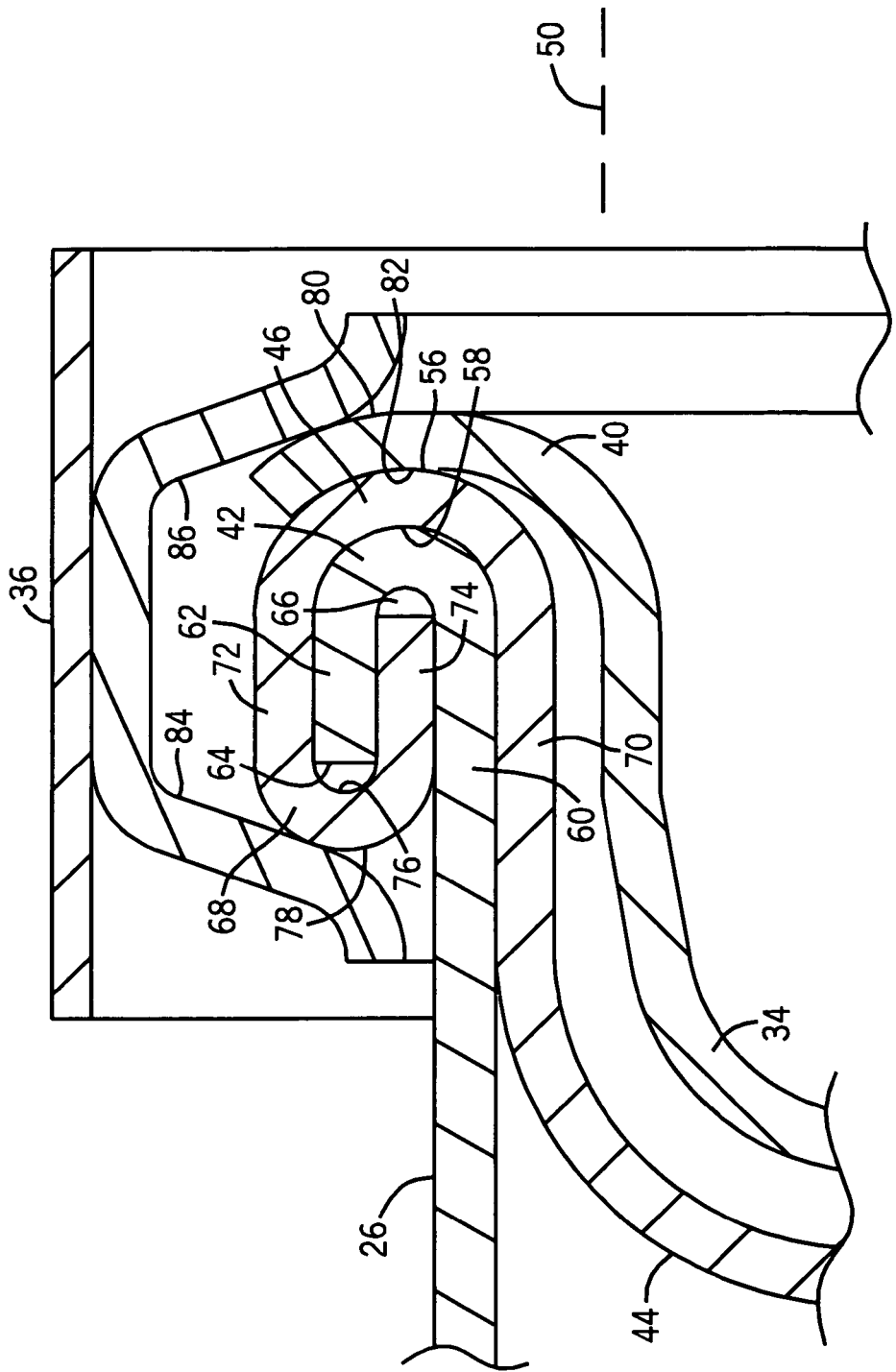
FIG. 10 is an enlarged view of a portion of FIG. 3.

Each of end plate 34 and open end 30 of body 26 has a flared rounded portion 40 and 42, respectively, FIGS. 3, 10. An apertured flange 44 has an outer border with a flared rounded portion 46 complemental to the flared rounded portions 40 and 42 of each of end plate 34 and open end 30 of body 26. Apertured flange 44 has an inner border defined by an aperture 48 therethrough. Element 28 is removed and replaced through aperture 48.

Body 26 extends axially along an axis 50 between first and second axially distally opposite axial ends 52 and 54. Axial end 52 is the open end 30. Flared rounded portions 40, 42, 46 of end plate 34 and of open end 30 of body 26 and of apertured flange 44, respectively, are all axially aligned. Flared rounded portion 46 of apertured flange 44 is located axially between flared rounded portion 40 of end plate 34 and flared rounded portion 42 of open end 30 of body 26.

Figure 9:
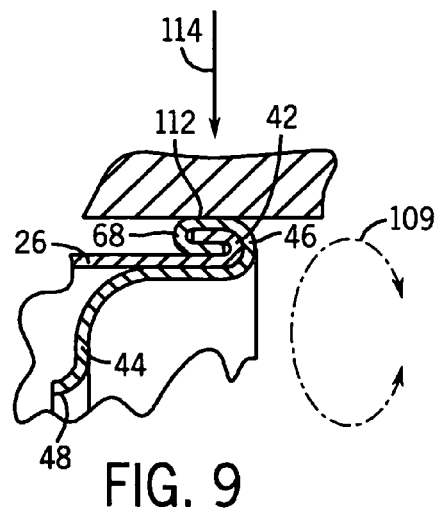
FIG. 9 is like FIG. 8 and shows a further manufacturing step.

Flared rounded portion 46 of apertured flange 44 has a first arcuate surface 56, FIGS. 9, 10, facing in a first axial direction (rightwardly in FIGS. 9, 10) away from second axial end 54 of body 26. Flared rounded portion 46 of apertured flange 44 has a second arcuate surface 58 facing in a second axial direction (leftwardly in FIGS. 9, 10) toward second axial end 54 of body 26. First arcuate surface 56 of flared rounded portion 46 of apertured flange 44 engages flared rounded portion 40 of end plate 34. Second arcuate surface 58 of flared rounded portion 46 of apertured flange 44 engages flared rounded portion 42 of open end 30 of body 26.

Open end 30 of body 26 has a first section 60, FIGS. 9, 10, extending axially along the noted first axial direction (rightwardly in FIGS. 9, 10) to flared rounded portion 42 of open end 30 of body 26, and has a second section 62 extending axially along the noted second axial direction (leftwardly in FIGS. 9, 10) from flared rounded portion 42 of open end 30 of body 26. Second section 62 has a terminating end 64 spaced laterally outwardly of first section 60 by a pocket 66 of given lateral width. Flared rounded portion 46 of apertured flange 44 is a first rounded portion of the apertured flange. Apertured flange 44 has a second rounded portion 68. Apertured flange 44 has a first section 70 extending axially along the noted first axial direction (rightwardly in FIGS. 9, 10) to the first rounded portion 46 of apertured flange 44, and has a second section 72 extending axially along the noted second axial direction (leftwardly in FIGS. 9, 10) from first rounded portion 46 of apertured flange 44 to second rounded portion 68 of apertured flange 44, and has a third section 74 extending axially along the noted first axial direction (rightwardly in FIGS. 9, 10) from second rounded portion 68 of apertured flange 44. Third section 74 of apertured flange 44 extends axially rightwardly into pocket 66.

Second rounded portion 68 of apertured flange 44 has a first arcuate surface 76, FIGS. 9, 10, facing axially in the noted first axial direction (rightwardly in FIGS. 9, 10) toward terminating end 64 of second section 62 of open end 30 of body 26. Second rounded portion 68 of apertured flange 44 has a second arcuate surface 78 facing axially in the noted second axial direction (leftwardly in FIGS. 9, 10) and engaged by clamp 36. Rounded portion 40 of end plate 34 has a first arcuate surface 80 facing axially in the noted first axial direction (rightwardly in FIG. 10), and has a second arcuate surface 82 facing axially in the noted second axial direction (leftwardly in FIG. 10). Second arcuate surface 82 of rounded portion 40 of end plate 34 engages first arcuate surface 56 of first rounded portion 46 of apertured flange 44. First arcuate surface 80 of rounded portion 40 of end plate 34 is engaged by clamp 36. Clamp 36 has first and second engagement surfaces 84 and 86. Engagement surface 84 faces axially in the noted first axial direction (rightwardly in FIG. 10) and engages second arcuate surface 78 of second rounded portion 68 of apertured flange 44. Second engagement surface 86 of the clamp faces axially in the noted second axial direction (leftwardly in FIG. 10) and engages first arcuate surface 80 of rounded portion 40 of end plate 34.

Apertured flange 44 is curled around open end 30 of body 26 in an interference lock-fit permanently mounted to body 26 such that apertured flange 44 remains on body 26 upon removal of end plate 34. Flared rounded portion 42 of open end 30 of body 26 has a convex curvature facing in the noted first axial direction (rightwardly in FIG. 10) away from second axial end 54 of body 26. Flared rounded portion 46 of apertured flange 44 is the noted first rounded portion of apertured flange 44. Apertured flange 44 has the noted second rounded portion 68. First rounded portion 46 of apertured flange 44 has a convex curvature facing in the noted first axial direction (rightwardly in FIG. 10). Second rounded portion 68 of apertured flange 44 has a convex curvature facing in the noted second axial direction (leftwardly in FIG. 10) toward second axial end 54 of body 26. The noted first and second rounded portions 46 and 68 of apertured flange 44 are axially spaced from each other and engage the open end of body 26 at axially spaced engagement points 46 and 68, with body section 62 trapped therebetween, preventing axial movement of apertured flange 44 along body 26.

The present invention provides a method for servicing muffler 20. Clamp 36 is released by untightening threaded bolt 38 to permit removal of end plate 34 from open end 30 of body 26 for gaining access to element 28. Element 28 is removed axially rightwardly as shown at arrow 32 in FIG. 2 through aperture 48, FIG. 3, of apertured flange 44, while apertured flange 44 remains mounted to open end 30 of body 26.

Figure 4:
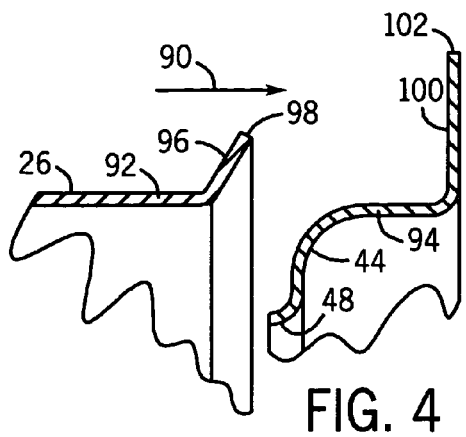
FIG. 4 is an enlarged exploded view of a portion of FIG. 1 illustrating an initial manufacturing step.

FIGS. 4–9 illustrate a preferred manufacturing method for making serviceable muffler 20. In FIG. 4, apertured flange 44 is inserted into body 26, e.g. by moving body 26 axially rightwardly as shown at arrow 90 onto apertured flange 44, or vice versa, with axially extending sidewall 92 of body 26 in abutting relation with axially extending sidewall 94 of apertured flange 44, FIG. 5. In the preferred embodiment, sidewall 92 of body 26 has a pre-flared laterally extending portion 96 at a first end 98, and sidewall 94 of apertured flange 44 has a pre-flared laterally extending portion 100 at a first end 102. Upon the noted insertion 90, sidewall portion 96 flattens against sidewall portion 100. First end 102 of sidewall 94 of apertured flange 44 extends laterally beyond first end 98 of sidewall 92 of body 26. First end 102 of sidewall 94 of apertured flange 44 is engaged with a first mandrel 104, FIG. 6, having a curved engagement surface 106. Mandrel 104 is moved laterally inwardly, which is downwardly in FIGS. 6 and 7 as shown at arrow 108, toward body 26, while the latter is turning about its centerline along axis 50, as illustrated at 109, to further flare and curl the sidewall of apertured flange 44 at portion 100 around first end 98 of the sidewall of body 26, FIG. 7. Mandrel 104 continues to move downwardly, FIG. 8, to move the mandrel laterally inwardly toward body 26 to further flare and curl both of the noted sidewalls 92 and 94 at respective portions 96 and 100 around open end 30 of the body.

Figure 8:
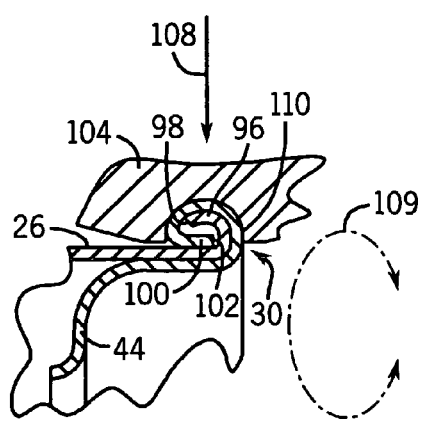
FIG. 8 is like FIG. 7 and shows a further manufacturing step.

Upon completion of the noted movement of mandrel 104 at 108 in FIG. 8, the noted first end 98 of portion 96 of sidewall 92 of body 26 is spaced laterally outwardly of first end 102 of portion 100 of sidewall 94 of apertured flange 44 by a lateral gap 110 therebetween, FIG. 8. A second mandrel 112, FIG. 9, which may be a different mandrel than mandrel 104 or maybe a different surface of mandrel 104, is then moved laterally inwardly toward body 26, which is downwardly as shown at arrow 114 in FIG. 9, to engage the noted curled and flared sidewall of apertured flange 44 at portion 100, while body 26 is turning about its centerline along axis 50, as illustrated at 109, to close lateral gap 110 of FIG. 8 and move first end 98 of portion 96 of sidewall 92 of body 26 laterally inwardly into engagement with first end 102 of portion 100 of sidewall 94 of apertured flange 44. The resulting structure is that shown in FIG. 9, wherein, as above noted, the open end of the body has a first section 60, FIGS. 9, 10, extending axially along the noted first axial direction (rightwardly in FIGS. 9, 10) to the flared rounded portion 42 of open end 30 of body 26, and has a second section 62 extending axially along the noted second axial direction (leftwardly in FIGS. 9, 10) from flared rounded portion 42 of open end 30 of body 26, with second section 62 having a terminating end 64 spaced laterally outwardly of first section 60 by pocket 66 of given lateral width after closing of gap 110, and wherein flared rounded portion 46 of apertured flange 44 is a first rounded portion of the apertured flange, and wherein the apertured flange has a second rounded portion 68, and wherein apertured flange 44 has the noted first section 70 extending axially along the noted first axial direction (rightwardly in FIGS. 9, 10) to first rounded portion 46 of apertured flange 44, and has the noted second section 72 extending axially along the noted second axial direction (leftwardly in FIGS. 9, 10) from first rounded portion 46 of apertured flange 44 to second rounded portion 68 of apertured flange 44, and has the noted third section 74 extending axially along the noted first axial direction (rightwardly in FIGS. 9, 10) from second rounded portion 68 of apertured flange 44, and wherein third section 74 extends axially rightwardly into pocket 66.

Section 72 of the sidewall of apertured flange 44 is laterally outward of and in engagement with section 62 of the sidewall of body 26. Section 62 of the sidewall of body 26 is laterally outward of and in engagement with section 74 of the sidewall of apertured flange 44. Section 74 of the sidewall of apertured flange 44 is laterally outward of and in engagement with section 60 of the sidewall of body 26. Section 60 of the sidewall of body 26 is laterally outward of and in engagement with section 70 of the sidewall of apertured flange 44.

Figure 5:
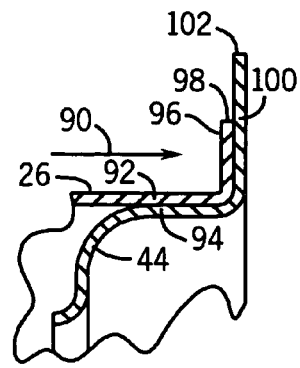
FIG. 5 is like FIG. 4 and shows a further manufacturing step.
Figure 6:
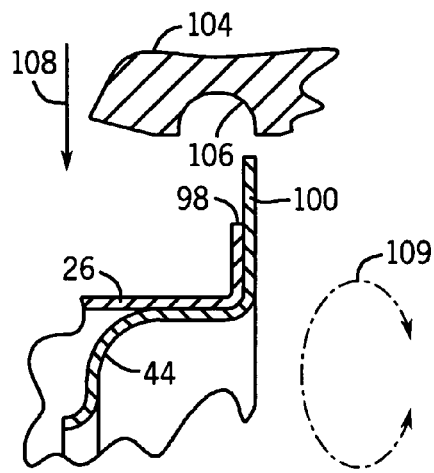
FIG. 6 is like FIG. 5 and shows a further manufacturing step.
Figure 7:
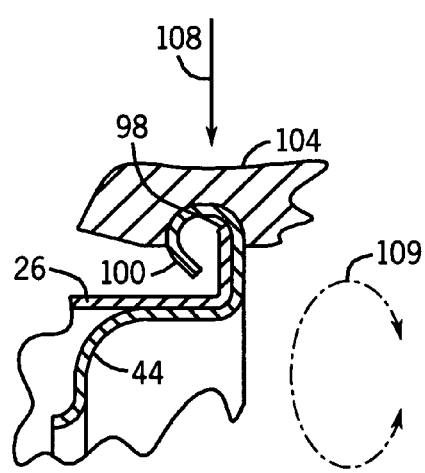
FIG. 7 is like FIG. 6 and shows a further manufacturing step.

In the preferred method, apertured flange 44 is inserted into body 26, FIGS. 4, 5, such that the sidewall of the apertured flange extends beyond the noted first end 98 of the sidewall of body 26 such that the noted first end 102 of the sidewall of the apertured flange is spaced from the first end 98 of the sidewall of the body. The sidewall of the apertured flange is then flared and curled around the first end 98 of the sidewall of the body, and both sidewalls 96, 100 are flared and curled around the open end of the body. In the preferred manufacturing method, the sidewalls of the apertured flange and the body are pre-flared as shown in FIG. 4 at 96 and 100.

It is recognized that various equivalents, alternatives and modifications are possible within the scope of the appended claims.

What is claimed is:

1. A serviceable muffler comprising a muffler body for containing an element requiring servicing, said body having an open end allowing access to said element for removal and replacement of said element through said open end, an end plate closing said body at said open end, at least one of said end plate and said open end of said body having a flared rounded portion, a clamp releasably clamping said end plate to said open end to close said body and being releasable to permit removal of said end plate from said open end of said body for gaining access to said element, wherein each of said end plate and said open end of said body has a flared rounded portion, and further comprising in combination an apertured flange having an outer border with a flared rounded portion complemental to the flared rounded portion of each of said end plate and said open end of said body, said apertured flange having an inner border defined by an aperture therethrough, wherein said element in said body is removed and replaced through said aperture, wherein said body extends axially along an axis between first and second axially distally opposite axial ends, said first axial end being said open end, and wherein said flared rounded portions of said end plate and of said open end of said body and of said apertured flange are all axially aligned, and wherein said flared rounded portion of said apertured flange is located axially between and in engagement with each of said flared rounded portion of said end plate and said flared rounded portion of said open end of said body.

2. A serviceable muffler comprising a muffler body for containing an element requiring servicing, said body having an open end allowing access to said element for removal and replacement of said element through said open end, an end plate closing said body at said open end, at least one of said end plate and said open end of said body having a flared rounded portion, a clamp releasably clamping said end plate to said open end to close said body and being releasable to permit removal of said end plate from said open end of said body for gaining access to said element, wherein each of said end plate and said open end of said body has a flared rounded portion, and further comprising in combination an apertured flange having an outer border with a flared rounded portion complemental to the flared rounded portion of each of said end plate and said open end of said body, said apertured flange having an inner border defined by an aperture therethrough, wherein said element in said body is removed and replaced through said aperture, wherein said body extends axially along an axis between first and second axially distally opposite axial ends, said first axial end being said open end, and wherein said flared rounded portions of said end plate and of said open end of said body and of said apertured flange are all axially aligned, and wherein said flared rounded portion of said apertured flange is located axially between said flared rounded portion of said end plate and said flared rounded portion of said open end of said body, wherein said flared rounded portion of said apertured flange has a first arcuate surface facing in a first axial direction away from said second axial end of said body, and has a second arcuate surface facing in a second axial direction toward said second axial end of said body, said second axial direction being opposite to said first axial direction, and wherein said first arcuate surface of said flared rounded portion of said apertured flange engages said flared rounded portion of said end plate, and said second arcuate surface of said flared rounded portion of said apertured flange engages said flared rounded portion of said open end of said body, wherein said open end of said body has a first section extending axially along said first axial direction to said flared rounded portion of said open end of said body, and has a second section extending axially along said second axial direction from said flared rounded portion of said open end of said body, said second section having a terminating end spaced laterally outwardly of said first section by a pocket of given lateral width, wherein said flared rounded portion of said apertured flange is a first rounded portion of said apertured flange, and wherein said apertured flange has a second rounded portion, and wherein said apertured flange has a first section extending axially along said first axial direction to said first rounded portion of said apertured flange, and has a second section extending axially along said second axial direction from said first rounded portion of said apertured flange to said second rounded portion of said apertured flange, and has a third section extending axially along said first axial direction from said second rounded portion of said apertured flange, and wherein said third section of said apertured flange extends axially into said pocket, wherein said second rounded portion of said apertured flange has a first arcuate surface facing axially in said first axial direction toward said terminating end of said second section of said open end of said body, and has a second arcuate surface facing axially in said second axial direction and engaged by said clamp, and wherein said rounded portion of said end plate has a first arcuate surface facing axially in said first axial direction, and has a second arcuate surface facing axially in said second axial direction, said second arcuate surface of said rounded portion of said end plate engaging said first arcuate surface of said first rounded portion of said apertured flange, said first arcuate surface of said rounded portion of said end plate being engaged by said clamp, said clamp having first and second engagement surfaces, said first engagement surface facing axially in said first axial direction and engaging said second arcuate surface of said second rounded portion of said apertured flange, said second engagement surface facing axially in said second axial direction and engaging said first arcuate surface of said rounded portion of said end plate.

3. A method for making a serviceable muffler comprising providing a muffler body for containing an element requiring servicing, said body having an open end allowing access to said element for removal and replacement of said element through said open end, said body extending axially along an axis between first and second distally opposite axial ends, said first axial end being said open end, said body having an axially extending sidewall, providing an apertured flange having an outer border for cooperating with said open end of said body, and having an inner border defined by an aperture therethrough, wherein said element in said body is removed and replaced through said aperture, said apertured flange having an axially extending sidewall, and comprising inserting said apertured flange into said body, with said sidewalls in abutting relation, and flaring at least one of said sidewalls to a flared rounded configuration having a convex curvature facing in a first axial direction away from said second axial end of said body, for receiving an end plate clamped thereto, wherein said sidewall of said body has a pre-flared laterally extending portion at a first end, said sidewall of said apertured flange has a pre-flared laterally extending portion at a first end extending laterally beyond said first end of said sidewall of said body, and comprising engaging first end of said sidewall of said apertured flange with a mandrel having a curved engagement surface, and moving said mandrel laterally inwardly toward said body to further flare and curl said sidewall of said apertured flange around said first end of said sidewall of said body, and continuing to move said mandrel laterally inwardly to further flare and curl of both of said sidewalls around said open end of said body, wherein at the completion of said continued movement of said mandrel, said first end of said sidewall of said body is spaced laterally outwardly of said first end of said sidewall of said apertured flange by a lateral gap therebetween, and comprising engaging said curled and flared sidewall of said apertured flange with a second mandrel, and moving said second mandrel laterally inwardly to close said lateral gap and move said first end of said sidewall of said body laterally into engagement with said first end of said sidewall of said apertured flange.

4. A serviceable muffler comprising a muffler body for containing an element requiring servicing, said body having an open end allowing access to said element for removal and replacement of said element through said open end, an end plate closing said body at said open end, at least one of said end plate and said open end of said body having a flared rounded portion, a clamp releasably clamping said end plate to said open end to close said body and being releasable to permit removal of said end plate from said open end of said body for gaining access to said element, each of said end plate and said open end of said body has a flared rounded portion, and further comprising in combination an apertured flange having an outer border with a flared rounded portion complemental to the flared rounded portion of each of said end plate and said open end of said body, said apertured flange having an inner border defined by an aperture therethrough, wherein said element in said body is removed and replaced through said aperture, wherein said body extends axially along an axis between first and second axially distally opposite axial ends, said first axial end being said open end, and wherein said flared rounded portions of said end plate and of said open end of said body and of said apertured flange are all axially aligned, and wherein said flared rounded portion of said apertured flange is located axially between said flared rounded portion of said end plate and said flared rounded portion of said open end of said body, wherein said flared rounded portion of said apertured flange has a first arcuate surface facing in a first axial direction away from said second axial end of said body, and has a second arcuate surface facing in a second axial direction toward said second axial end of said body, said second axial direction being opposite to said first axial direction, and wherein said first arcuate surface of said flared rounded portion of said apertured flange engages said flared rounded portion of said end plate, and said second arcuate surface of said flared rounded portion of said apertured flange engages said flared rounded portion of said open end of said body, wherein said open end of said body has a first section extending axially along said first axial direction to said flared rounded portion of said open end of said body, and has a second section extending axially along said second axial direction from said flared rounded portion of said open end of said body, said second section having a terminating end spaced laterally outwardly of said first section by a pocket of given lateral width, wherein said flared rounded portion of said apertured flange is a first rounded portion of said apertured flange, and wherein said apertured flange has a second rounded portion, and wherein said apertured flange has a first section extending axially along said first axial direction to said first rounded portion of said apertured flange, and has a second section extending axially along said second axial direction from said first rounded portion of said apertured flange to said second rounded portion of said apertured flange, and has a third section extending axially along said first axial direction from said second rounded portion of said apertured flange, and wherein said third section of said apertured flange extends axially into said pocket, said second section of said apertured flange being laterally outward of and engaging said second section of said open end of said body, said second section of said open end of said body being laterally outward of and engaging said third section of said apertured flange, said third section of said apertured flange being laterally outward of and engaging said first section of said open end of said body, said first section of said open end of said body being laterally outward of and engaging said first section of said apertured flange.

5. The serviceable muffler according to claim 4 wherein said end plate extends laterally inwardly from said flared rounded portion of said end plate and then extends axially in said second axial direction along an axial extension section, said axial extension section of said end plate being laterally inwardly spaced from said first section of said apertured flange by a lateral gap therebetween.

* * * * *